C. A. HABENICHT.
LOCK FAUCET.
APPLICATION FILED APR. 1, 1913.
1,181,002. Patented Apr. 25, 1916.
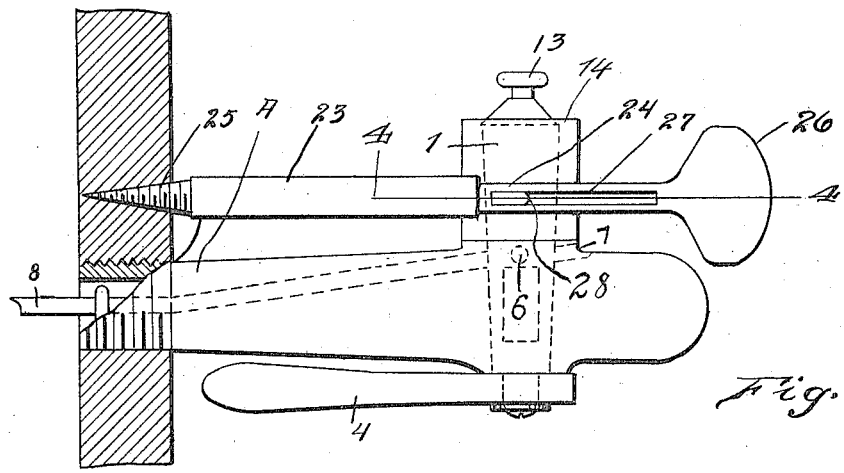
Fig. 1.
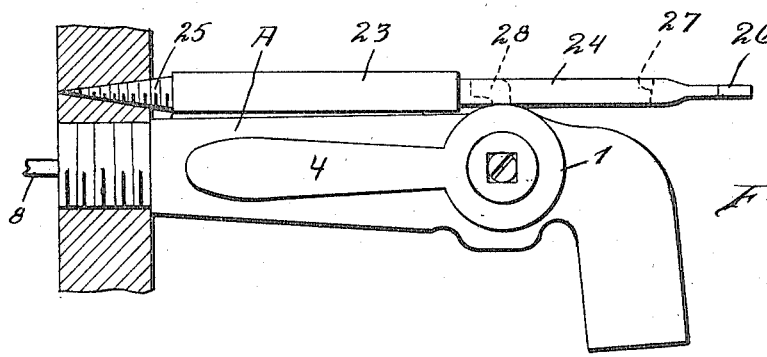
Fig. 2.
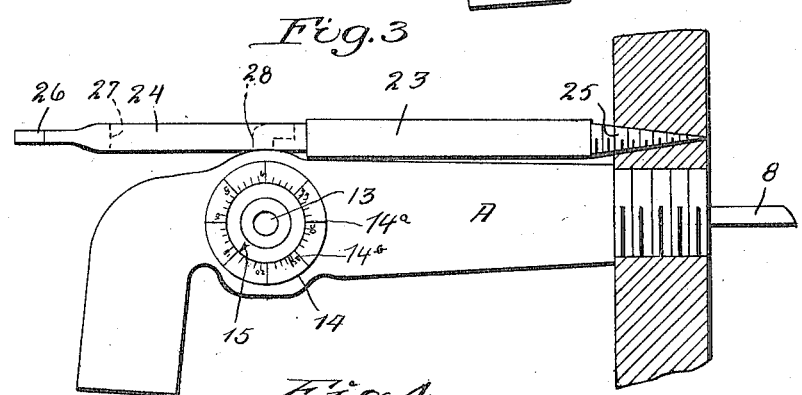
Fig. 3.
Fig. 4.
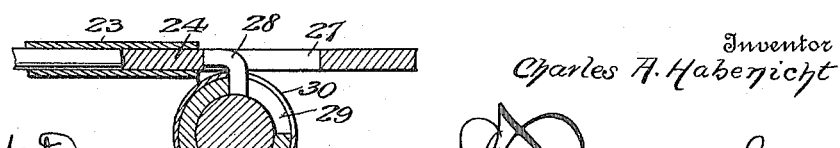
Inventor
Charles A. Habenicht
Witnesses

UNITED STATES PATENT OFFICE.

CHARLES A. HABENICHT, OF GREAT FALLS, MONTANA.

LOCK-FAUCET.

1,181,002. Specification of Letters Patent. Patented Apr. 25, 1916.

Application filed April 1, 1913. Serial No. 758,278.

*To all whom it may concern:*

Be it known that I, CHARLES A. HABENICHT, a citizen of the United States, residing at Great Falls, in the county of Cascade and State of Montana, have invented certain new and useful Improvements in Lock-Faucets, of which the following is a specification.

My invention relates to faucets for tapping kegs, barrels, etc., and has for its object the provision of means for locking the valve member to prevent opening of the faucet by an unauthorized person, said locking means consisting of a permutation lock.

My invention furthermore, comprises means associated with the valve locking means by which the cock or faucet itself is locked in position on the keg or barrel when the valve is closed and in a locked position.

My invention will be described in detail hereinafter and illustrated in the accompanying drawings, in which, Figure 1 is a top plan view of my improved faucet shown partly in section; Fig. 2, one side elevation of my improved faucet; Fig. 3, a side elevation of the opposite side of the faucet from that shown in Fig. 2; Fig. 4, a fragmental sectional view on the plane indicated by the line 4—4 of Fig. 1.

In the drawings similar reference characters will be used to designate corresponding parts throughout the several views.

My improved lock faucet is shown mounted on a cock or faucet A provided with a laterally extending tubular portion 1 to receive the rotating valve member 2 that is tapered as shown in the drawings and extended through an opening formed opposite to the tubular casing 1 and has a handle 4 secured to its extended end for manipulating said valve. The valve member 2 is provided with the opening 5 that is moved into and out of alinement with the longitudinal bore of the faucet for opening and closing it in the ordinary manner and is also provided with an opening 6 parallel with the opening 5 that is adapted to aline with an air vent 7 formed in the front part of the faucet body and a vent passage 8 extended rearwardly of the valve member and out of the rear end of the faucet into the keg or barrel to vent it when the valve member is in position to permit withdrawal of the contents of the keg or barrel through the faucet A.

As stated heretofore the object of my invention is to provide a spigot that cannot be operated or removed from a keg or barrel to which it is connected by an unauthorized person and to this end my invention comprises a permutation locking means inclosed by the tubular casing 1 mounted on the end of the valve member 2 farthest removed from the handle 4 and operable to release or lock the valve member 2 by a knob 13. A cap 14 is provided and secured on to the tubular portion 1 and has its outer end formed with a circular opening 14ª to receive the knob 13. The end of the cap surrounding the opening 14ª is provided with a dial 14ᵇ and the knob 13 is provided with a notch 15 to assist in operating the lock.

It will be apparent that my improved lock spigot would not be a complete protection against the theft of the contents of a container to which it may be attached without some means being provided by which the spigot itself may not be removed when the valve member is in a locked position and to this end my invention provides in combination with the means for locking the valve member a means for also preventing the spigot from being removed while the valve is closed and locked. I will now proceed to describe the means for locking the spigot in engagement with the keg or barrel.

Mounted upon one side of the body of the spigot A is a web or flange ending in the tubular casing 23 that is substantially parallel with the axis of the spigot and has mounted therein a rod 24 provided at one of its extremities with a tapered threaded portion 25 while its other extremity is provided with a handle 26 for rotating said rod. The rod 24 is also provided with a longitudinal slot 27 and the valve member 2 has a laterally extending angular pin 28 to engage said slot 27, said pin 28 projecting through slots 29 and 30 in the casing 1 and cap 14, respectively.

It will be understood from this construction that when the valve is in the closed position as shown in the drawings the angular pin 28 engages the slot 27 in the rod 24 and prevents rotation of said rod so that it cannot be unscrewed from the cask or barrel, and as said rod 24 by engaging said cask or barrel prevents rotation of the cock or faucet A, it will be apparent that when the angular pin 28 is in engagement with the slot 27, the valve being in a closed position, the cock or faucet will be effectually prevented from being removed from the cask or barrel and when the valve member is locked by the permutation locking means the entire device will be so positioned and arranged that none of the contents of the cask or barrel can be removed unless by a person familiar with the means for operating the locking mechanism.

Having thus described my invention, what I claim is:—

In a locking faucet, in combination with the body of a faucet, a rotating valve member mounted in said faucet body, a tubular casing mounted on said faucet body, a straight rod slidably mounted in said casing and having one end enlarged to provide a handle, the opposite end of said rod being adapted to be secured to a cask or barrel to which the faucet may be secured, said rod being provided with a longitudinal slot, a pin carried by the valve member aforesaid adapted to engage said slot to prevent rotation of the rod or faucet body when the valve is in a closed position and means to lock the valve in closed position.

In testimony whereof I affix my signature in presence of two witnesses.

CHARLES A. HABENICHT.

Witnesses:
LEN J. LAMBKIN,
HOWARD G. BENNET.